(12) United States Patent
Noda

(10) Patent No.: US 7,301,651 B2
(45) Date of Patent: Nov. 27, 2007

(54) INFORMATION PROCESSOR, PRINTING APPARATUS, INFORMATION PROCESSING SYSTEM, PRINTING METHOD AND PRINTING PROGRAM

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 09/968,011

(22) Filed: Oct. 2, 2001

(65) Prior Publication Data

US 2002/0041389 A1   Apr. 11, 2002

(30) Foreign Application Priority Data

Oct. 6, 2000 (JP) ............................. 2000-308315
Sep. 27, 2001 (JP) ............................. 2001-295705

(51) Int. Cl.
*G06K 15/00* (2006.01)
(52) U.S. Cl. ..................................... 358/1.13; 358/1.1
(58) Field of Classification Search ................ 358/1.1, 358/1.13, 1.14, 1.15, 504, 406; 399/8, 70; 400/74

See application file for complete search history.

(56) References Cited

U.S. PATENT DOCUMENTS

| | | | | |
|---|---|---|---|---|
| 5,581,668 A | * | 12/1996 | Oida et al. | 358/1.14 |
| 5,937,148 A | * | 8/1999 | Okazawa | 358/1.13 |
| 6,280,105 B1 | * | 8/2001 | Iida | 400/74 |
| 6,813,037 B1 | * | 11/2004 | Collard | 358/1.15 |
| 2004/0246512 A1 | * | 12/2004 | Miyamoto | 358/1.13 |

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

A print output apparatus, etc., designed to effectively increase the speed of printing started when the apparatus is in a sleep state. Before print data is transferred to the print output apparatus, a first command for making the print output apparatus to execute processing for shifting from the sleep state to a standby state and a second command to stop calibration processing are sent to the print output apparatus.

19 Claims, 11 Drawing Sheets

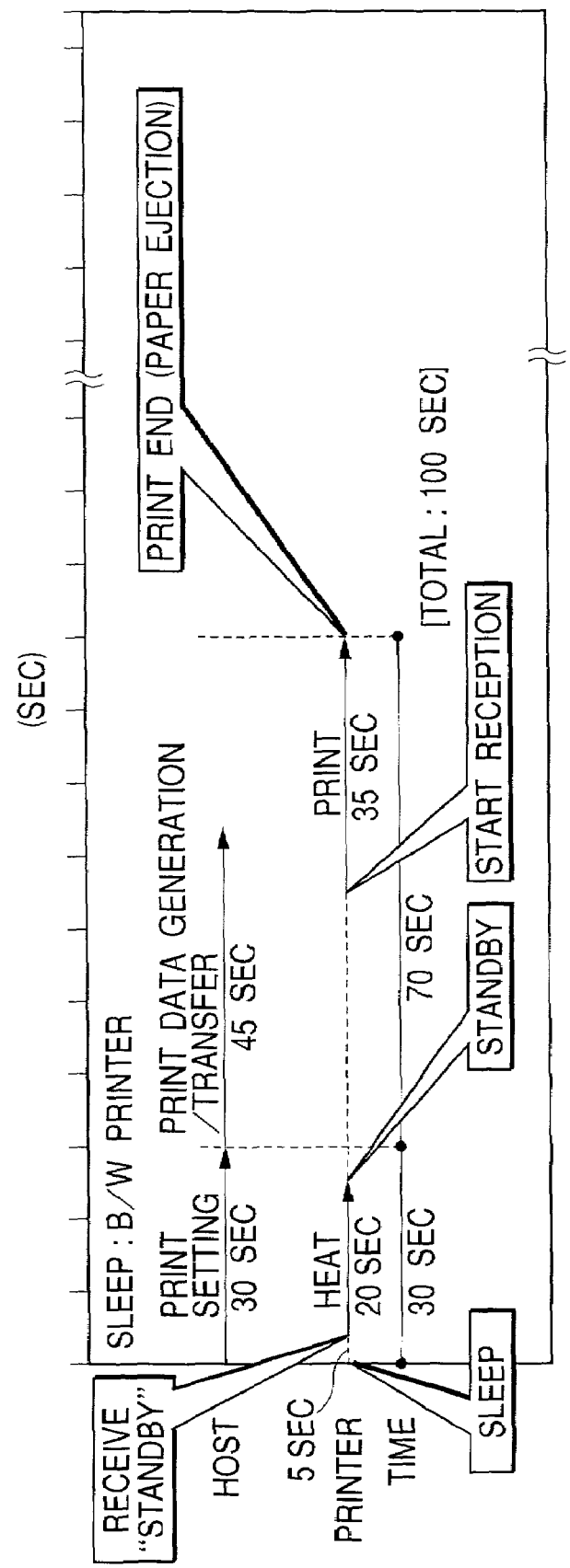

INFORMATION PROCESSOR, PRINTING APPARATUS, INFORMATION PROCESSING SYSTEM, PRINTING METHOD AND PRINTING PROGRAM

BACKGROUND OF THE INVENTION

1. Field of the Invention

The present invention relates to a printing system constituted by a host unit and a print output apparatus for performing printing of print data supplied from the host unit.

2. Related Background Art

Conventionally, print output apparatuses (hereinafter referred to as a printer) in information processing systems form images by fixing toner, ink or the like on paper, etc. For example, laser beam printers and copying machines have a mechanism for fixing toner on paper by heating a thermal transfer drum portion.

Some laser beam printers require electric power of, for example, about 765 W for printing (heating). Such high electric power is required because of the need to heat the thermal transfer drum portion to a high temperature and to rapidly heat the drum to a temperature at which printing can be performed. If the heating time period is reduced, the time period taken to start printing is reduced. That is, it is possible to increase the overall printing speed by reducing the heating time period.

A technique has therefore been used in a printer which sets a printer in a standby state in which the thermal transfer drum portion is constantly maintained at a temperature close to the high temperature at which printing can be performed. The technique enables the printer to start printing immediately after receiving the print data and to always perform high-speed printing if the frequency of use of the printer is high.

However, if the frequency of use of the printer is low, a large amount of electric power consumed in the standby state (e.g., about 183 W) is wasted. For this reason, a technique has been used in many printers which sets the state of the printer to be shifted from the standby state to a sleep state in which power consumption is automatically limited in the case where the printer is maintained in the standby state without being used during certain time period. More specifically, when the printer is shifted to the sleep state, the temperature at which the thermal transfer drum portion is kept is reduced or the heat-retention is stopped. For example, the power consumption in the sleep state is about 22 W and there is an effect of reducing the power consumption by 161 W compared to that of the standby state.

A technique has also been used which automatically performs processing for shifting to the standby state, including heating the thermal transfer drum portion, when the print data is received in the sleep state.

As described above, the conventional printers are designed so as to operate selectively in the standby state or the sleep state, thereby achieving both high-speed printing in a situation where the frequency of use is high and an economical effect in a situation where the frequency of use is low.

SUMMARY OF THE INVENTION

The above-described conventional printers, however, has a problem of a considerable reduction in printing speed in the case where printing is started when the printer is in the sleep state. This is because printing is started only after processing for shifting from the sleep state to the standby state has been completed.

A situation where such a problem arises will be described in detail with reference to FIGS. 12A, 12B, 13A, and 13B.

A printing system has a host computer and a printer connected to each other in a one-to-one relationship, for example. If the printer is a machine for black-and-white (B/W) printing, a printing process started by the host computer when the printer is in the standby state is performed as shown in FIG. 12A.

A user makes the host computer display a dialog box of software (a printer driver or the like) as shown in FIG. 4 to the print data according to his or her need. The time taken to complete print setting through this dialog box is assumed to be 30 seconds. This print setting comprises designating the printer to be used, print attributes (color/black-and-white, a paper size, a paper ejection port, a paper feed port, etc.), and a print style and details of the style (simplex/duplex print, N-up print, binding margins, etc.).

The user presses a printing button in the dialog box shown in FIG. 4 to start printing. The printer driver thereafter receives drawing data from an application, converts the drawing data into the print data obtained as a printable material, and successively sends the print data to the printer. The time taken to complete this print data preparation and transfer is assumed to be 45 seconds.

It is also assumed that the printer starts receiving the print data 35 seconds after the moment at which the printer driver starts processing, and that the time taken to complete printing (which ends by completing paper ejection) in the printer is 35 seconds. In this case, the time period from the moment at which the user starts the printing operation to the moment at which an output sheet is ejected is 100 seconds, as shown in FIG. 12A.

In a case where the printing process using the same data in the B/W printer is started by the host computer when the printer is in the sleep state, the printing process is performed as shown in FIG. 12B. In this case, from the moment at which the printer starts receiving the print data 35 seconds after the moment at which the printer driver starts processing, 20 seconds are taken to complete state-shift processing, i.e., heating the thermal transfer drum.

Since printing is executed after the completion of the state-shift processing, the time period from the moment at which the user starts the printing operation to the moment at which an output sheet is ejected is 120 seconds, as shown in FIG. 12B. That is, the speed of printing from the sleep state is reduced by 20 seconds compared to that of printing started from the standby state.

If the printer is a color printer, processing for shifting from the sleep state to the standby state may include calibration processing which is correction processing for improving the quality of images in color and the reproducibility of colors. That is, a phenomenon occurs in which the quality of a visible image formed by the printer is reduced due to electrical and mechanical causes in the process of forming the visible image, which are, in most cases, environmental changes and wear of each component of the printer. To solve this problem, a technique has been used which improves the image quality by using a density measuring sensor, etc., provided in the printer, by preparing suitable correction data, and by preparing the print data in which the correction data is reflected.

However, this processing is complicated and a considerably long time is required for execution of it. In some color laser beam printers, about 90 seconds are taken for calibration processing, so that the reduction in speed of printing from the sleep state is much larger than that in the B/W machine. In the color machine, the same reduction in printing speed is also caused as in the case of performing B/W printing.

In the case where the printer is a color machine, the printing process started by the host when the printer is in the standby state includes no state-shift processing, and requires 100 seconds as the time period from the moment at which the user starts the printing operation to the moment at which an output sheet is ejected, as shown in FIG. 13A.

The printing process using the same data and started by the host when the color printer is in the sleep state is performed as shown in FIG. 13B. In this case, the printer starts receiving the print data 35 seconds after the moment at which the printer driver starts processing, heating of the thermal transfer drum portion is then started and continued for 20 seconds, and 90 seconds are taken before the completion of calibration processing. That is, 110 seconds are taken for state-shift processing. Since printing is executed after the completion of state-shift processing, the time period from the moment at which the user starts the printing operation to the moment at which an output sheet is ejected is 210 seconds, as shown in FIG. 13B. That is, the speed of printing from the sleep state is reduced by 110 seconds compared to that of printing started from the standby state.

The present invention has been made in view of the above-described problem of the conventional art, and an object of the present invention is therefore to provide a print output apparatus, etc., capable of effectively increasing the printing speed even when printing is started from the sleep state.

BRIEF DESCRIPTION OF THE DRAWINGS

In the accompanying drawings:

FIG. 6 is a timing chart of the printing operation of the first embodiment;

DETAILED DESCRIPTION OF THE PREFERRED EMBODIMENTS

Embodiments of the present invention will be described with reference to the accompanying drawings.

First Embodiment

Figure 1:
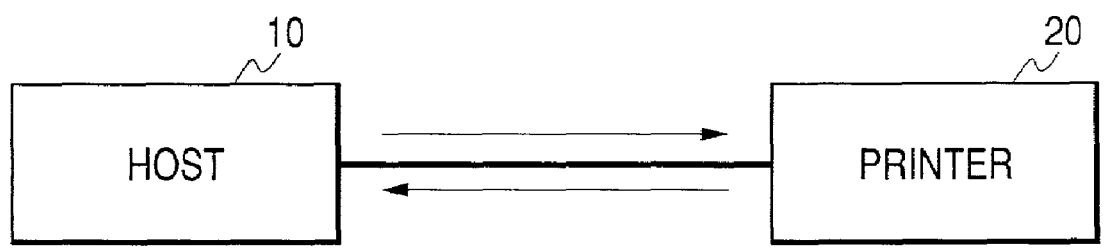
FIG. 1 is a block diagram showing the configuration of an information processing system relating to a first embodiment of the present invention.
Figure 2:
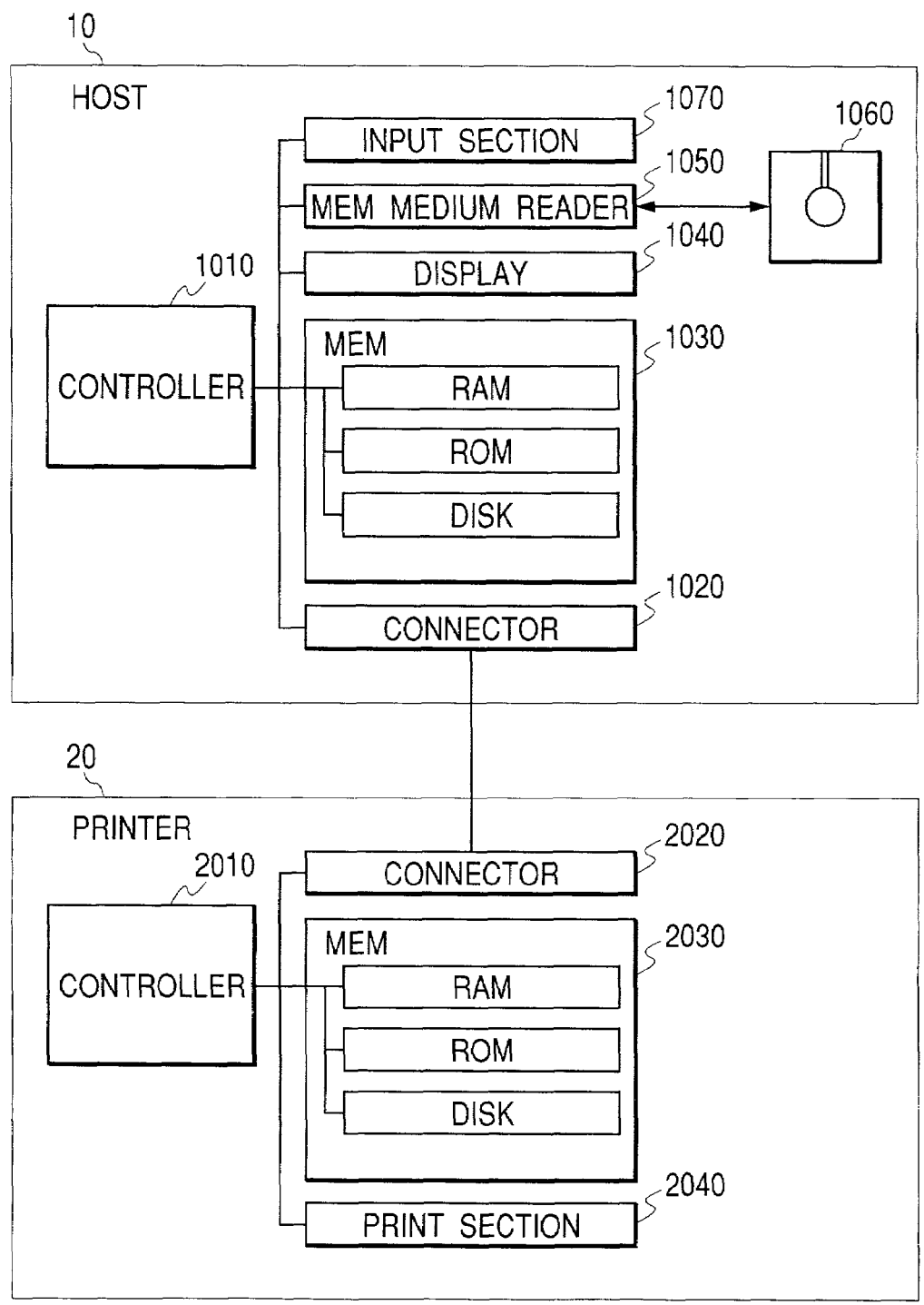
FIG. 2 is a block diagram showing the internal configurations of a host and a printer shown in FIG. 1.

FIG. 1 is a block diagram showing the configuration of an information processing system relating to a first embodiment of the present invention. FIG. 2 is a block diagram showing the internal configurations of a host and a printer shown in FIG. 1.

This information processing system is formed by connecting a host computer 10 and a printer 20 in a one-to-one relationship. The host computer 10 is capable of providing a state-shift instruction to the printer 20, and the printer 20 has the function of state-shift processing according to the instruction from the host computer 10.

As shown in FIG. 2, the host computer 10 is constituted by a controller 1010, a connector 1020, a memory section 1030, a display 1040, a memory medium reader 1050, a memory medium 1060, and an input section 1070. The printer 20 is constituted by a controller 2010, a connector 2020, a memory section 2030, and a print section 2040.

The host computer 10 is formed by a personal computer, a workstation, a minicomputer or the like. Each of the connectors 1020 and 2020 is constituted by a serial interface board, a parallel interface board, a network interface board or the like. Each of the memory sections 1030 and 2030 is constituted by memory devices, and a magnetic disk unit, a magneto-optical disc unit, a magnetic tape unit or the like. The print section 2040 is of a laser beam type, a bubble jet type, a light emitting diode (LED) type, or a thermal transfer type. The display 1040 is a cathode ray tube (CRT), a liquid crystal display or the like.

The input section 1070 is constituted by a keyboard and a mouse, a track ball or the like. The memory medium reader 1050 is constituted by a floppy disk (FD) unit, a magneto-optical (MO) unit, a compact disc-read only memory (CD-ROM) unit, an IC memory card unit or the like. The memory medium 1060 is a hard disk (HD), an MO disc, a CD-ROM, an IC memory card or the like.

The printer 20 may be replaced with a plotter, a copying machine, a facsimile machine or the like. Each of the controllers 1010 and 2010 may be constituted by a software, a read-only memory (ROM), a random access memory (RAM), etc.

In this embodiment, the printer 20 is a B/W machine in a sleep state and printer information (information about B/W machine) is stored in a RAM in the memory section 1030 of the host computer 10.

Figure 3:
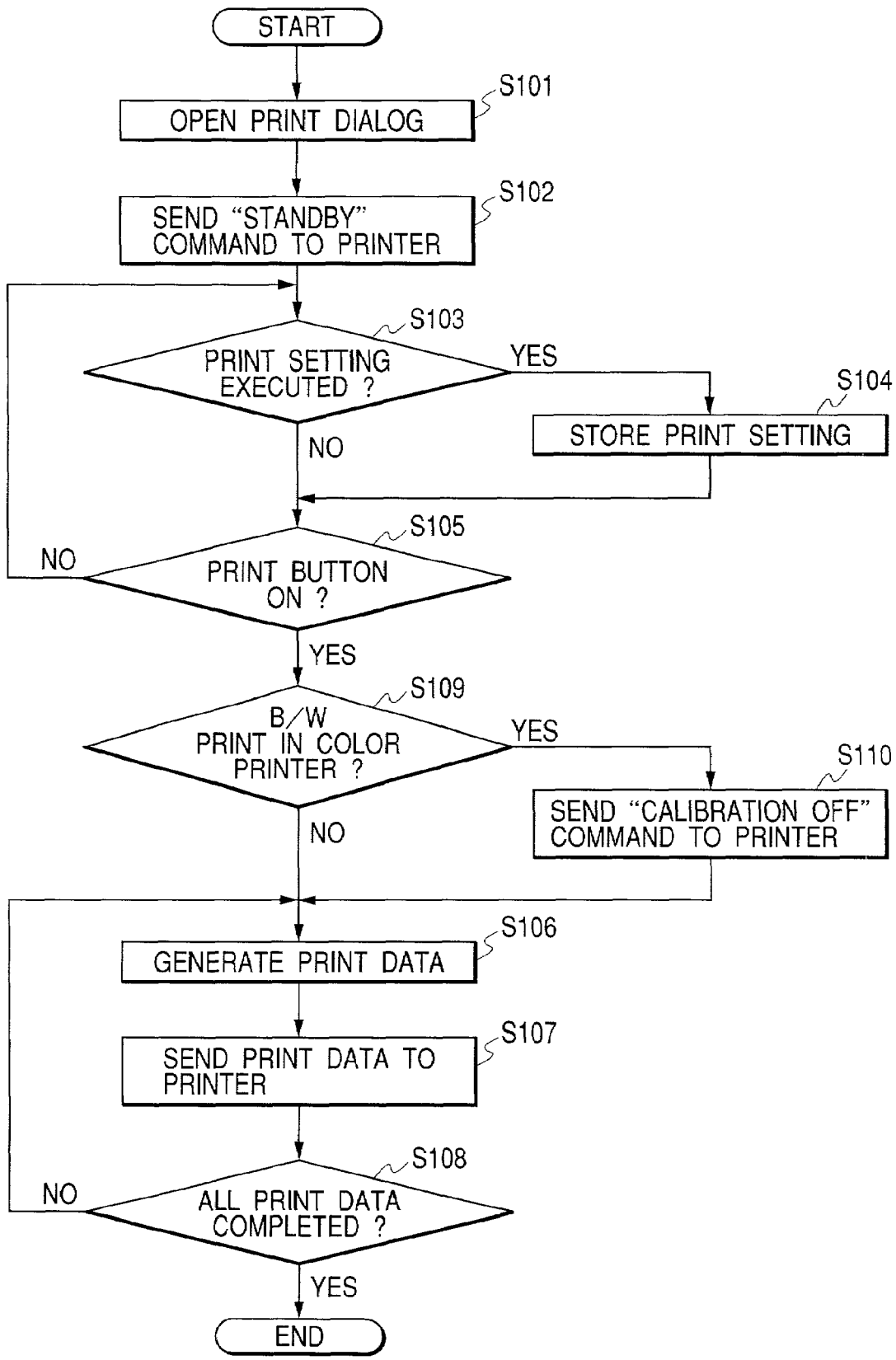
FIG. 3 is a flowchart showing processing in a host computer 10.
Figure 4:
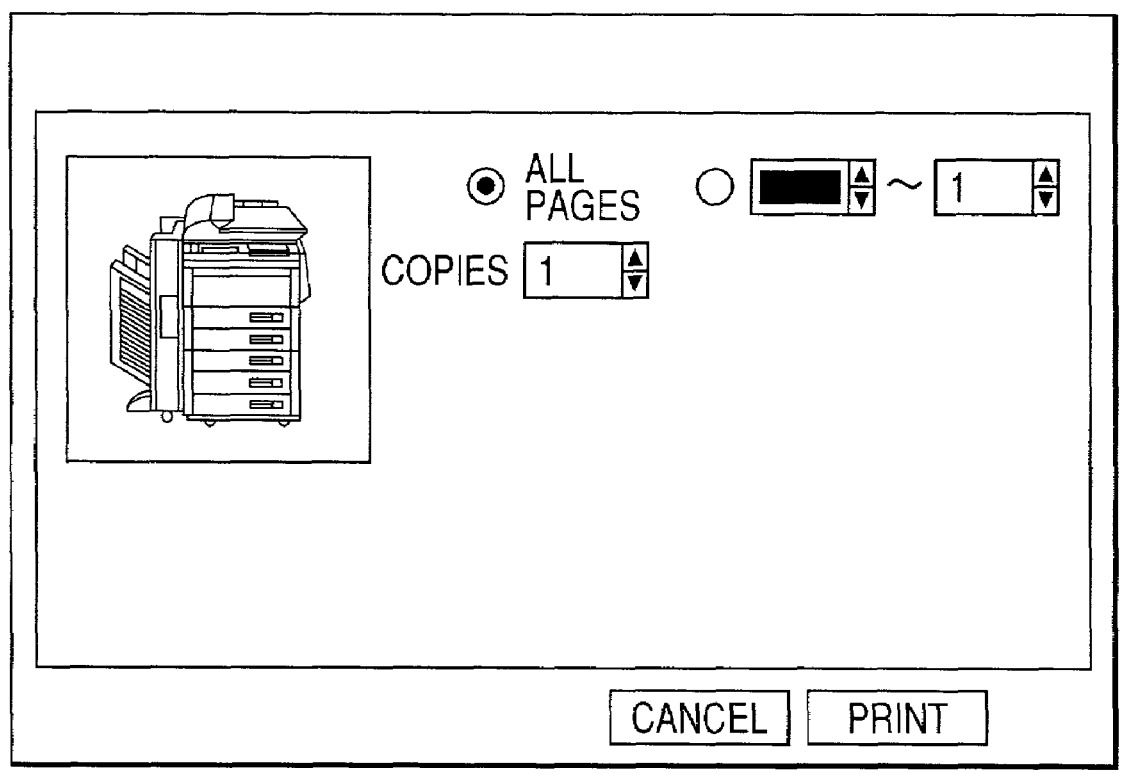
FIG. 4 is a diagram showing an example of a display of a print dialog box.
Figure 5:
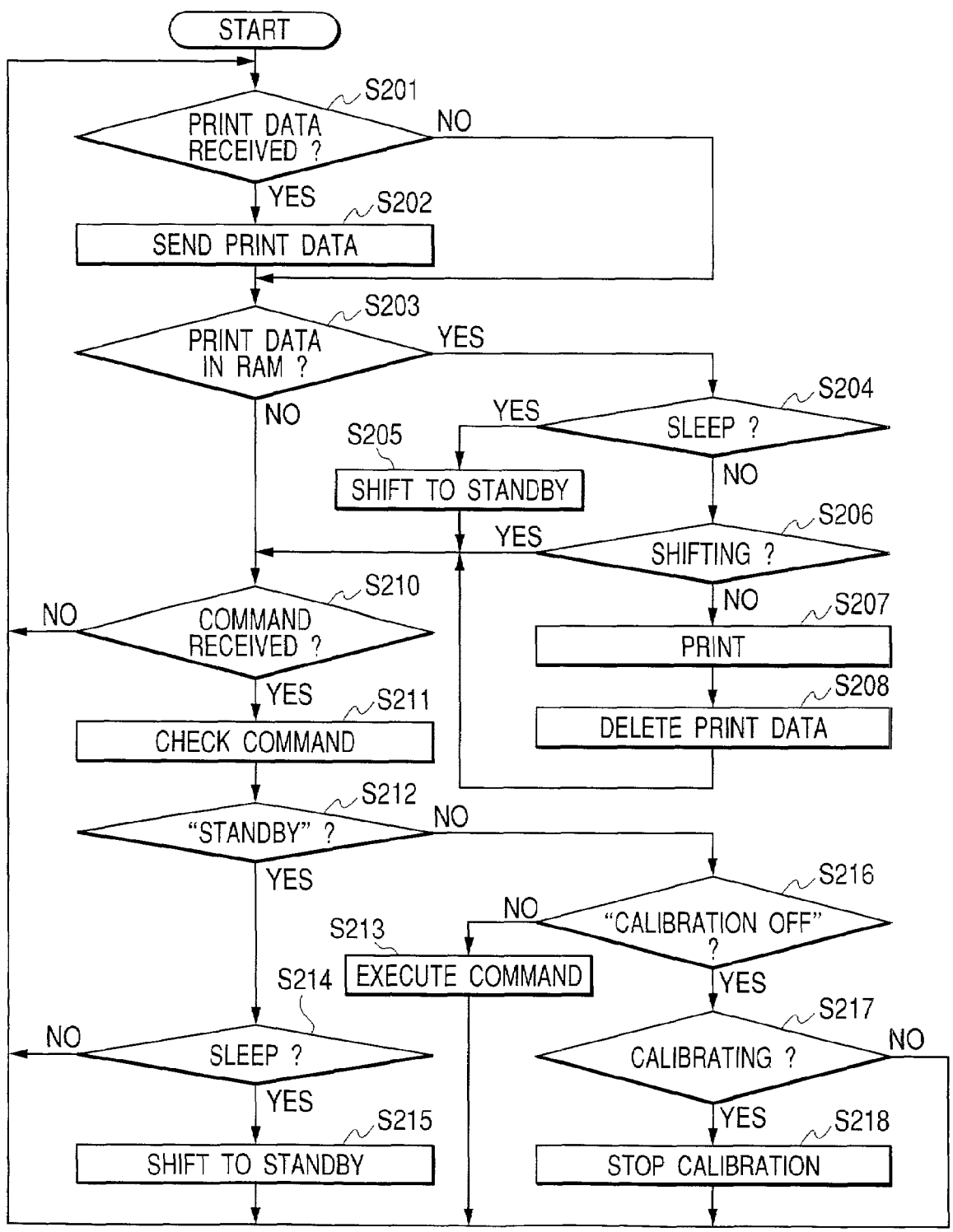
FIG. 5 is a flowchart showing processing in a printer 20.

A printing process performed by the thus arranged information processing system will be described in detail with reference to FIGS. 3 to 6. FIG. 3 is a flowchart showing processing on the host computer 10 side, and FIG. 4 is a diagram showing an example of a display of a printing dialog. Further, FIG. 5 is a flowchart showing processing on the printer 20 side, and FIG. 6 is a timing chart showing the printing process in the first embodiment.

<Processing 1 in Host Computer 10>

First, a user performs print setting through the host computer 10 by displaying a print dialog box (FIG. 4) of a software (a printer driver or the like) for preparing the print data (step S101 in FIG. 3), and the controller 1010 immediately sends a command "standby" for shifting from the sleep state to the standby state to the printer 20 (step S102).

More specifically, the controller 1010 sends a command "standby" to the controller 2010 of the printer 20 via the connector 1020 of the host computer 10 and the connector 2020 of the printer 20. The controller 2010 of the printer 20 temporarily stores the command received in the RAM of the memory section 2030. The command "standby" may be sent to the printer 20 via a server.

<Processing 1 in Printer 20>

Processing in the printer 20 from the sleep state will be described on the assumption that the host computer 10 has sent the command "standby" to the printer 20.

The controller 2010 of the printer 20 makes a determination as to whether any print data has been received from the host computer 10 (step S201 in FIG. 5). If the controller 2010 determines that some print data has been received, it temporarily stores the received print data in the RAM of the memory section 2030 (step S202). Since in this example the host computer 10 has transmitted no print data to the printer 20, the controller 2010 of the printer 20 determines that no print data has been received.

The controller 2010 of the printer 20 checks the contents of the RAM of the memory section 2030 and makes a determination as to whether any print data exists (step S203). If the controller 2010 determines that some print data exists, it then makes a determination as to whether the printer is presently in the sleep state or not (step S204). Since in this example no print data is stored, the controller 2010 of the printer 20 determines that no print data exists.

Subsequently, the controller 2010 of the printer 20 checks the contents of the RAM of the memory section 2030 and makes a determination as to whether any command has been received (step S210). If the controller 2010 determines that no command has been received, it returns the process to step S201. Since in this example the command has been sent from the host computer 10 in step S102 and stored in the printer 20, the controller 2010 of the printer 20 determines that the command has been received.

Next, the controller 2010 of the printer 20 checks the contents of the RAM of the memory section 2030 to recognize the content of a command (step S211), and makes, from the result of checking in step S211, a determination as to whether the content of the command is "standby" (step S212). If the content of the command is other than "standby", the controller 2010 makes a determination from the result of step S211 as to whether the content of the command is "calibration off" (step S216).

Since the printer is a B/W machine in this embodiment, the content of the command is other than "calibration off" and the controller 2010 executes processing according to the content of the command (step S213). For example, if the command is provided as an inquiry about the size of paper loaded in the printer 20, the controller 2010 sends information such as "A4", "A3" or "B4" back to the host computer 10. Since in this example the command sent from the host computer 10 in step S102 is "standby", the controller 2010 of the printer 20 determines that the content of the command is "standby" in step S212.

The controller 2010 of the printer 20 then makes a determination as to whether the printer is presently in the sleep state (step S214). If the printer is not in the sleep state, the controller 2010 returns the process to step S201. Since in this example the printer 20 is in the sleep state, the controller 2010 starts processing for shifting from the sleep state to the standby state, the printer entering a shifting state (step S215). The process then returns to step S201.

The processing time from execution of step S101 in the host computer 10 to execution of step S215 in the printer 20 is assumed to be 5 seconds. That is, as shown in FIG. 6, 5 seconds after the moment at which the dialog box is displayed as a start of the printing operation by the user, shift processing is started in the printer 20.

The processing time assumed to be 5 seconds in this embodiment varies depending on the connection form, the throughputs of the computer 10 and the printer 20, and other environmental conditions. Since the printer 20 is assumed to be a B/W machine, only heating is performed as shift processing. A time of 20 seconds is taken to heat the thermal transfer drum portion of the printer 20, and the time period from the moment at which the user displays the dialog box as a start of the printing operation to the moment at which shift processing is completed is 25 seconds. The printer then enters the standby state and starts printing if some print data exists.

<Processing 2 in Host Computer 10>

Processing in the host computer 10 from step S103 will now be described. The controller 1010 of the host computer 10 makes a determination as to whether the user has performed print setting through the input section 1070 (step S103 in FIG. 3). Since in this example the controller 1010 makes this determination immediately after opening of the dialog box, it determines that the user has not performed print setting. The controller 1010 then makes a determination as to whether the user has pressed a print button through the input section 1070 (step S105). Since in this example the controller 1010 makes this determination immediately after opening of the dialog box, it determines that the user has not pressed the print button and returns the process to step S103.

Thereafter, steps 103 to S105 are repeated. It is assumed here that at a certain point of time, the user performs print setting comprising designating the name of the printer 20 for outputting, print attributes (B/W, a paper size of A4, an upper portion of the printer body as a paper ejection port, and an upper cassette as a paper feed port), and a print style and details of the style (simplex print, and binding margins) through the input section 1070. The controller 1010 then determines in step S103 that print settings have been selected, and stores information on the settings in the RAM of the memory section 1030 (step S104), which is to be referred to when the print data is prepared afterwards.

When the user thereafter presses the print button through the input section 1070, the controller 1010 determines in step S105 that the print button is pressed.

The time period from the moment at which the user displays the dialog box as a start of the printing operation to the moment at which the user presses the print button after print setting is assumed to be 30 seconds, as shown in FIG. 6. In this case, since the time period from the moment at which the user displays the dialog box as a start of the printing operation to the moment at which shift processing is completed is 25 seconds, the printer 20 is set in the standby state at least 5 seconds before the time when the print data is transmitted from the host computer 10. That is, the print environment is such that, even though the printer 20 is in the sleep state when the printing operation is started, preparation and transfer of the print data can be performed in the same way as in the case of printing from the standby state.

Next, the controller 1010 refers to the printer 20 information and print attribute information stored in the RAM of the memory section 1030 of the host computer 10, and makes a determination as to whether the printer 20 for outputting is a color machine and whether a B/W output setting has been selected (step S109). Since in this example the printer is a B/W machine and since a B/W print setting has been selected, the process advances to step S106.

The controller 1010 then prepares a portion of the print data by receiving a portion of drawing data from an application, temporarily stores the prepared data in the RAM of the memory section 1030 of the host computer 10 (step S106), and sends to the printer 20 the print data portion temporarily stored in the RAM of the memory section 1030 (step S107). More specifically, the controller 1010 transfers the print data portion to the controller 2010 of the printer 20 via the connector 1020 of the host computer 10 and the connector 2020 of the printer 20.

<Processing 2 in Printer 20>

Processing in the printer 20, which follows that in the host computer 10, will be described. The controller 2010 of the printer 20 makes a determination as to whether any print data has been received from the host computer 10 (step S201). Since in this example the print data portion has been transmitted to the printer 20 from the host computer 10 in step S107, the controller 2010 of the printer 20 determines in step S201 that the print data has been received from the host computer 10.

Next, the controller 2010 of the printer 20 temporarily stores the received print data in the RAM of the memory section 2030 (step S202). Further, the controller 2010 checks the contents of the RAM of the memory section 2030 and makes a determination as to whether any print data exists therein (step S203). Since in this example the transmitted print data portion has been stored in step S202, the controller 2010 of the printer 20 determines that the print data exists.

Thereafter, the controller 2010 of the printer 20 makes a determination as to whether the printer 20 is presently in the sleep state (step S204). Since in this example step S215 in the printer 20 has been executed in step S102 in the host computer 10 to complete shift processing and to set the printer 20 in the standby state, the controller 2010 determines that the printer 20 is not in the sleep state.

Subsequently, the controller 2010 of the printer 20 makes a determination as to whether the printer 20 is presently in the shifting state (step S206). Since the printer 20 is in the standby state, the controller 2010 of the printer 20 determines that the printer 20 is not in the shifting state. The controller 2010 continues processing by referring to the print data stored in the RAM of the memory section 2030 (step S207). The controller 2010 deletes the processed data (step S208). The controller 2010 of the printer 20 then returns the process to step S210.

<Processing 3 in Host Computer 10>

Processing in the host computer 10 which follows the above-described processing will be described. The controller 1010 checks the contents of the RAM of the memory section 1030 and makes a determination as to whether preparation and transfer of the print data are completed (step S108). If the controller 1010 determines that preparation and transfer of the print data are completed, it ends the process.

Since in this example preparation and transfer of the print data are not completed, the controller 1010 returns the process to step S106.

Subsequently, the controller 1010 repeats steps S106 to S108 and ends the process when determining that preparation and transfer of the print data are completed.

<Processing 3 in Printer 20>

Processing in the printer 20 which follows the above-described processing will be described. The controller 2010 successively receives print data portions from the host computer 10 and repeats processing defined by the sequence of steps: steps S201, S202, S203, S204, S206, S207, S208, and S210, thereby completing printing of the print data received from the host computer 10.

As described above, the state-shift command is sent from the host computer 10 to the printer 20 immediately after the time when the dialog box is displayed, thereby enabling shift processing to be executed before transmission of the print data. Consequently, even in the case where the printer 20 starts the printing process when it is in the sleep state, the time period from the moment at which the user starts the printing operation to the moment at which an output sheet is ejected is 100 seconds, equal to that in the case of starting the printing process when the printer is in the standby state, as shown in FIG. 6.

Second Embodiment

A second embodiment of the present invention will be described, which has the same configurations as those shown in FIGS. 1 and 2, and in which the printer 20 is a color machine in the sleep state. It is assumed here that information on the printer (color machine) is stored in the RAM of the memory section 1030 of the host computer 10.

Figure 7A:
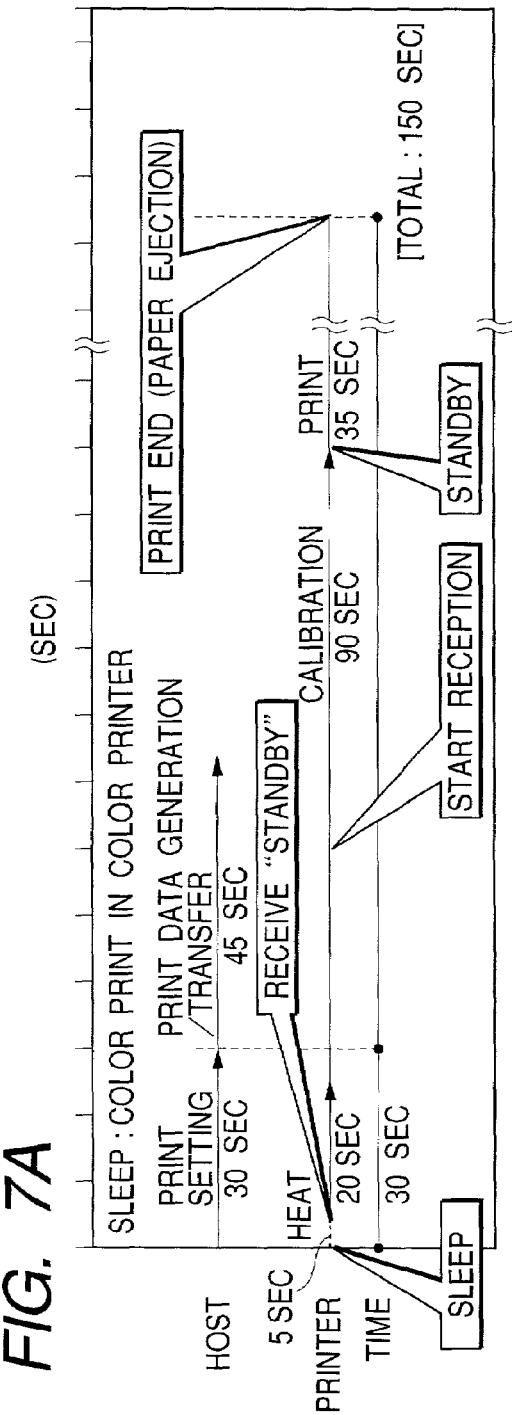
FIGS. 7A and 7B are timing charts of the printing operation of an information processing system in a second embodiment of the present invention.
Figure 7B:
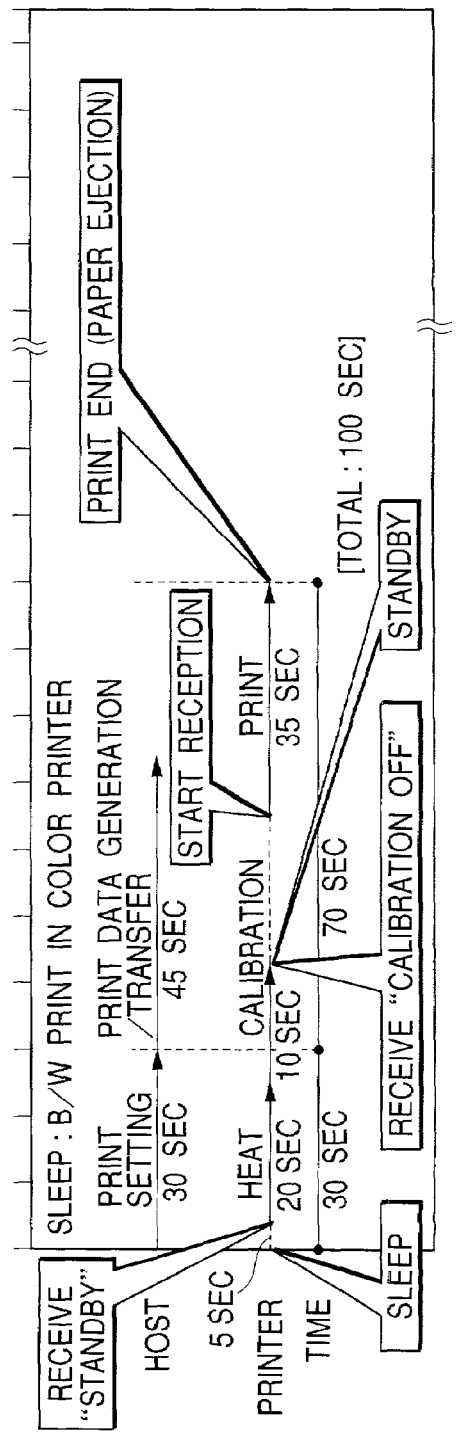

The printing process performed by the information processing system of this embodiment will be described in detail with reference to FIGS. 3 to 5, and 7A and 7B. FIGS. 7A and 7B are timing charts showing the printing process performed by the information processing system of the second embodiment. FIG. 7A shows the process with respect to color printing and FIG. 7B shows the process with respect to B/W printing.

The process when color printing is performed will first be described.

<Processing 1 in Host Computer 10>

The controller 1010 of the host computer 10 executes step S102 in FIG. 3 to send a command "standby" for shifting from the sleep state to the standby state to the printer 20, as it does in the operation with the B/W machine.

<Processing 1 in Printer 20>

The controller 2010 of the printer 20 executes step S215 in FIG. 5 to start processing for shifting from the sleep state to the standby state, thereby setting the printer 20 in the standby state. In this case, the processing time from the moment at which step S101 in the host computer 10 is executed to the moment at which step S215 in the printer 20 is executed is assumed to be 5 seconds, as shown in FIG. 7A.

Since the printer 20 is assumed to be a color machine, shift processing comprises heating and calibration processing by which shift processing is completed. That is, 20 seconds are taken to heat the thermal transfer drum portion of the printer 20, and 90 seconds are thereafter taken for calibration processing. Consequently, the time period from the moment at which the user displays the dialog box as a start of the printing operation to the moment at which shift processing is completed is 115 seconds. The printer 10 then enters the standby state and starts printing if the print data exists.

<Processing 2 in Host Computer 10>

Print setting is performed in steps S103 to S105 in the printer 20 for outputting, as is that in the B/W machine. The time period from the moment at which the user displays the dialog box as a start of the printing operation to the moment at which the user presses the print button after print setting is assumed to be 30 seconds, as shown in FIG. 7B. In this example of the process, the printer 20 is in a state of performing shift processing (shifting state).

The controller 1010 of the host computer 10 makes a determination as to whether the printer 20 for outputting is a color machine and whether a B/W output setting has been selected by referring to the printer information and print attribute information stored in the RAM of the memory section 1030 (step S109). Since in this example the printer 20 is a color machine and a color print setting has been selected, the process advances to step S106.

Next, the controller 1010 prepares a portion of the print data by receiving a portion of drawing data from an application, temporarily stores the prepared data in the RAM of the memory section 1030 of the host computer 10 (step S106).

Subsequently, the controller 1010 sends to the printer 20 the print data portion temporarily stored in the RAM of the memory section 1030 (step S107). More specifically, the controller 1010 transfers the print data portion to the controller 2010 of the printer 20 via the connector 1020 of the host computer 10 and the connector 2020 of the printer 20.

<Processing 2 in Printer 20>

The controller 2010 of the printer 20 makes a determination as to whether any print data has been received from the host computer 10 (step S201). Since in this example the print data portion has been transmitted to the printer 20 from the host computer 10 in step S107, the controller 2010 determines in step S201 that the print data has been received from the host computer 10.

Next, the controller 2010 temporarily stores the received print data in the RAM of the memory section 2030 (step S202). Further, the controller 2010 checks the contents of the RAM and makes a determination as to whether any print data exists therein (step S203). Since in this example the transmitted print data portion has been stored in step S202, the controller 2010 of the printer 20 determines that the print data exists.

Thereafter, the controller 2010 makes a determination as to whether the printer 20 is presently in the sleep state (step S204). Since in this example the printer 20 is in the shifting state, the controller 2010 of the printer 20 determines that the printer 20 is not in the sleep state. Further, the controller 2010 makes a determination as to whether the printer 20 is presently in the shifting state (step S206). Since in this example the printer 20 is in the shifting state, the controller 2010 determines that the printer 20 is in the shifting state, and moves the process to step S210.

Subsequently, the controller 2010 temporarily stores each of the print data portions successively transmitted from the host computer 10, since the printer 20 is in the shifting state while shift processing (complete calibration processing) is being executed. Steps S106 to S108 in the host computer 10 are repeatedly executed to complete transfer of the print data from the host computer 10, as shown in FIG. 7A.

Thereafter, shift processing (calibration processing) in the printer 20 is completed and printing (steps S203, S204, S206, S207, S208) of the print data already transferred is immediately executed, thereby completing the process.

As described above, even if the shift processing time is long as in color printing in a color machine, the shift-change command is sent from the host computer 10 to the printer 20 immediately after the display of the dialog box to enable shift processing to be started before a start of transfer of the print data. As a result, even in the case where the printing process is started when the printer 20 is in the sleep state, the time period from the moment at which the user starts the printing operation to the moment at which an output sheet is ejected can be reduced by 60 seconds compared to that of the conventional art.

The embodiment will next be described with respect to the case where the printer is a color machine and where B/W printing is performed.

<Processing 1 in Host Computer 10>

The controller 1010 executes step S102 to send the command "standby" for shifting from the sleep state to the standby state to the printer 20, as it does in the case of color printing in the color machine.

<Processing 1 in Printer 20>

The controller 2010 of the printer 20 executes step S215 to start processing for shifting from the sleep state to the standby state, thereby setting the printer 20 in the standby state. In this case, the processing time from the moment at which step S101 in the host computer 10 is executed to the moment at which step S215 in the printer 20 is executed is assumed to be 5 seconds, as shown in FIG. 7B.

Since the printer 20 is assumed to be a color machine, shift processing comprises heating and calibration processing by which shift processing is completed, as described above.

<Processing 2 in Host Computer 10>

Print setting is performed in steps S103 to S105 in the printer 20 for outputting, as described above. The time period from the moment at which the user displays the dialog box as a start of the printing operation to the moment at which the user presses the print button after print setting is assumed to be 30 seconds, as shown in FIG. 7A. In this example, the printer 20 is in a state of performing shift processing (shifting state).

The controller 1010 of the host computer 10 makes a determination as to whether the printer 20 for outputting is a color machine and whether a B/W output setting has been selected by referring to the printer information and print attribute information stored in the RAM of the memory section 1030 (step S109). Since in this example the printer 20 is a color machine and a B/W setting has been selected, the process advances to step S110.

Next, the controller 1010 immediately sends to the printer 20 the command "calibration off" to stop calibration (step 110). More specifically, the controller 1010 sends the command "calibration off" to the controller 2010 of the printer 20 via the connector 1020 of the host computer 10 and the connector 2020 of the printer 20. The controller 2010 of the printer 20 temporarily stores the received command in the RAM of the memory section 2030. The command "calibration off" may be sent to the printer 20 via a server 40.

<Processing 2 in Printer 20>

The controller 2010 of the printer 20 makes a determination as to whether any print data has been received from the host computer 10 (step S201). If the controller 2010 determines that some print data has been received, it temporarily stores the received print data in the RAM of the memory section 2030 (step S202). Since in this example the host computer 10 has transmitted no print data to the printer 20, the controller 2010 determines that no print data has been received.

Next, the controller 2010 checks the contents of the RAM of the memory section 2030 and makes a determination as to whether any print data exists (step S203). Since in this example no print data is stored, the controller 2010 of the printer 20 determines that no print data exists. Further, the controller 2010 checks the contents of the RAM of the memory section 2030 and makes a determination as to whether any command has been received (step S210). Since in this example the command has been sent from the host computer 10 in step S110 and stored in the printer 20, the controller 2010 determines that the command has been received.

Next, the controller 2010 of the printer 20 checks the contents of the RAM of the memory section 2030 (step S211) and makes, from the result of checking in step S211, a determination as to whether the content of the command is "standby" (step S212). If the content of the command is other than "standby", the controller 2010 makes a determination from the result of step S211 as to whether the content of the command is "calibration off" (step S216). Since in this example, the command sent from the host computer 10 in step S110 is "calibration off", the controller 2010 determines that the content of the command is "calibration off".

Next, the controller 2010 of the printer 20 checks the contents of the RAM of the memory section 2030 and makes a determination as to whether the printer 20 is in a state during calibration (step S217). If the printer 20 is not in a state during calibration, the controller 2010 returns the process to step S201. Since in this example the printer 20 is in a state during calibration, the controller 2010 stops calibration processing (step S218). The process then returns to step S201.

In this case, as shown in FIG. 7B, heating of the printer 20 is performed for 20 seconds and calibration processing is thereafter performed. However, calibration processing is stopped in step S218. In the example shown in FIG. 7B, calibration processing is assumed to be stopped 10 seconds after the moment at which it is started. The printer 20 enters the standby state when calibration is stopped. Thereafter, the printer can start printing when receiving the print data.

<Processing 3 in Host Computer 10>

The controller 1010 prepares a portion of the print data, temporarily stores the prepared data in the RAM of the memory section 1030 of the host computer 10 (step S106), sends the stored print data portion to the printer 20 (step S107), and makes a determination as to whether preparation and transfer of the print data are completed (step S108), as it does in the above-described case. Since in this example preparation and transfer of the print data are not completed, it returns the process to step S106.

Subsequently, the controller 1010 repeats steps S106 to S108 and ends the process when determining that preparation and transfer of the print data are completed.

<Processing 3 in Printer 20>

The controller 2010 of the printer 20 makes a determination as to whether any print data has been received from the host computer 10 (step S201). Since in this example the host computer 10 has transmitted the print data portion to the printer 20, the controller 2010 of the printer 20 determines that the print data has been received from the host computer 10.

The controller 2010 temporarily stores the received print data in the RAM of the memory section 2030 (step S202) and makes a determination as to whether any print data exists (step S203), as it does in the above-described case. Since in this example the transmitted print data portion is stored in step S202, the controller 2010 determines that the print data exists.

Subsequently, the controller 2010 makes a determination as to whether the printer 20 is in the sleep state (step S204). Since in this example the printer 20 is in the standby state, the controller 2010 of the printer 20 determines that the printer 20 is not in the sleep state. The controller 2010 then makes a determination as to whether the printer 20 is in the shifting state (step S206). Since in this example the printer 20 is in the standby state, the controller 2010 of the printer 20 determines that the printer 20 is not in the shifting state, and advances the process to step S207.

In step S207, the controller 2010 executes printing by referring to the print data stored in the RAM of the memory section 2030, as it does in the above-described case. The controller 2010 deletes the processed data (step S208).

Next, the controller 2010 checks the contents of the RAM of the memory section 2030 and makes a determination as to whether any command has been received (step S210). Since in this example no command has been sent from the host computer 10, the controller 2010 of the printer 20 determines that no command has been received, and returns the process to step S201.

As described above, unnecessary calibration processing is not performed when B/W printing is performed by the color machine, so that printing can be executed without being influenced by shift processing in the printer 30. Consequently, even in the case where the printer 20 starts the printing process when it is in the sleep state, printing can be completed in a reduced time period of 100 seconds. The time period is defined between the moment at which the user starts the printing operation and the moment at which an output sheet is ejected, and it is equal to the time period in the case of starting the printing process when the printer 20 is in the standby state.

Each of the above-described first and second embodiments of the present invention has been described on the assumption that modules in which the present invention is realized are loaded in the disk unit in the memory section 1030 of the host computer 10, and that the modules in which the present invention is realized are executed by being read to the RAM in the memory section 1030 of the host computer 10 when the host computer 10 is started. Similarly, each embodiment has been described on the assumption that modules in which the present invention is realized are loaded in the ROM in the memory section 2030 of the printer 20, and that the modules are executed by being read to the RAM in the memory section 2030 of the printer 20 when the printer 20 is started. The modules in which the present invention is realized are formed of program codes based on the flowchart shown in FIG. 3 or 5.

The form of connection between the host and the printer used in accordance with the present invention is not limited to the form in which the host and printer are connected in a one-to-one relationship as in each of the above-described embodiments. The present invention can also be applied to, for example, a system as shown in FIG. 8, in which a host and printers are connected to a print server.

Figure 8:
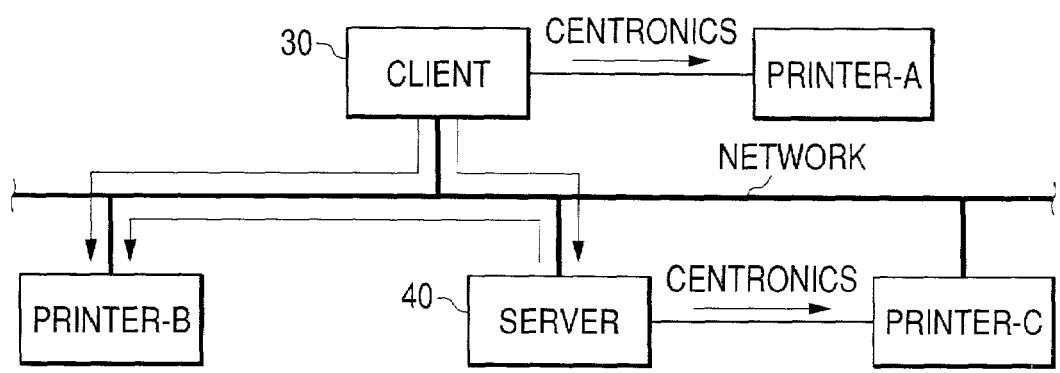
FIG. 8 is a block diagram showing another example of the form of connection between a host and a printer in accordance with the present invention.

A client 30 in the system shown in FIG. 8 is capable of obtaining an address (communication destination) of a printer (B) connected to a network even when it outputs data to the printer (B) via the server 40. The following are examples of means for obtaining this address.

(1) The client 30 obtains address information by broadcasting through the network.

(2) Addresses of printers to be controlled are held and a program (agent) having the function of replying to a request from the client 30 is loaded in the server 40. The client 30 obtains address information from the agent.

(3) The client 30 obtains a printer address through an event such as a print completion notification sent from the corresponding printer to the client 30.

Thus, the client 30 is enabled to perform direct communication (information acquisition, function setting) with the printer (B) while making the printer (B) perform printing through the server 40.

Figure 10:
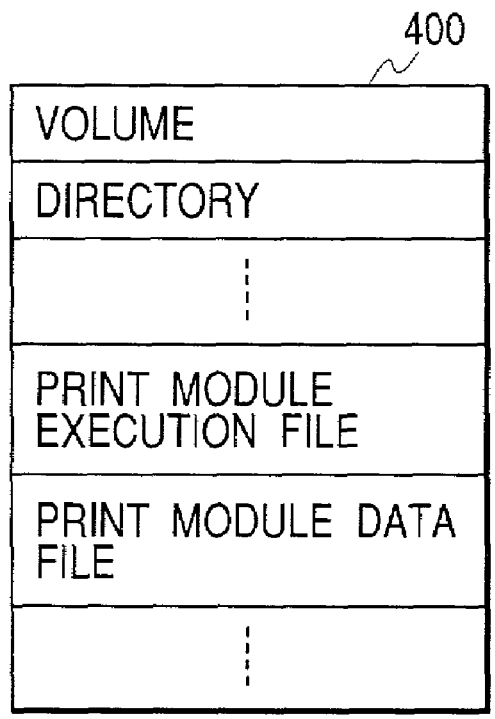
FIG. 10 is a diagram showing modules in accordance with the present invention and related data recorded on a memory medium.
Figure 11:
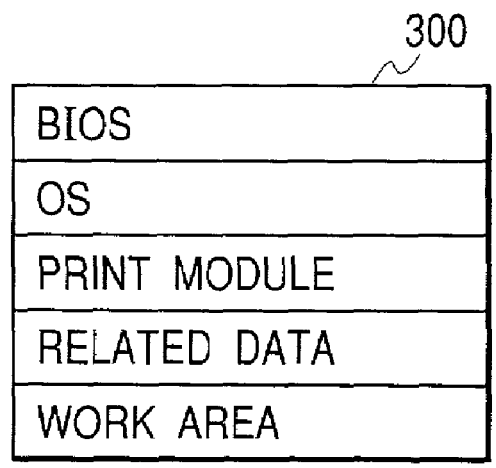
FIG. 11 is a diagram showing a memory map of the modules in accordance with the present invention in a state where the modules are made executable by being loaded into a RAM in a memory section of the host.
Figure 12A:
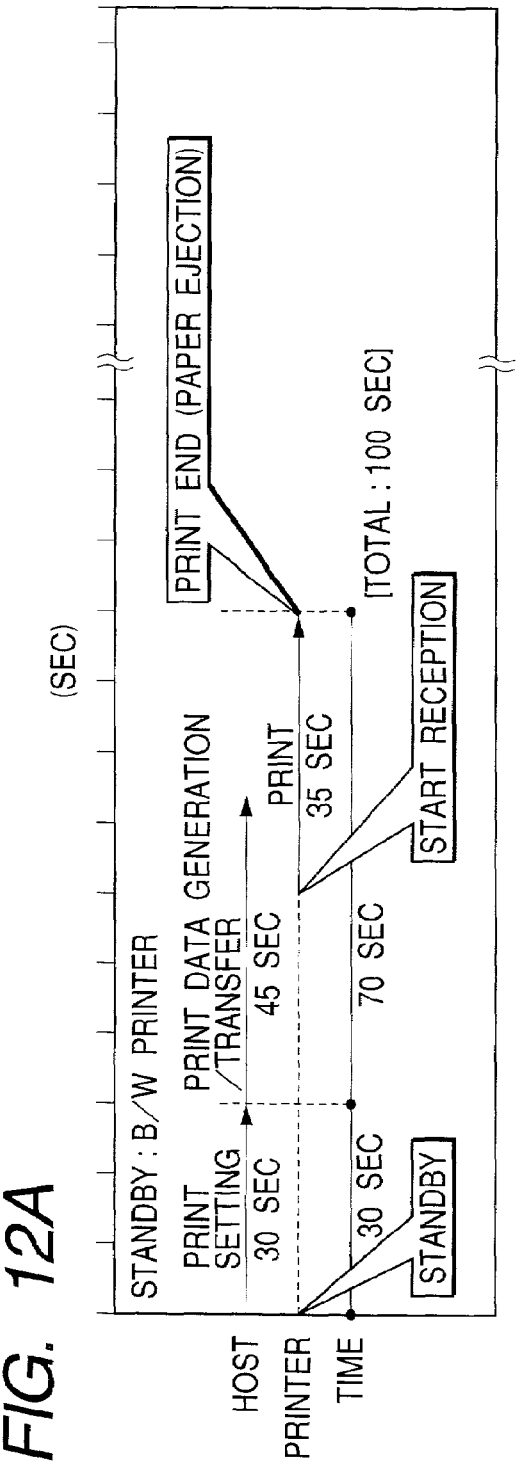
FIGS. 12A and 12B are timing charts of the printing operation of a conventional information processing system.
Figure 12B:
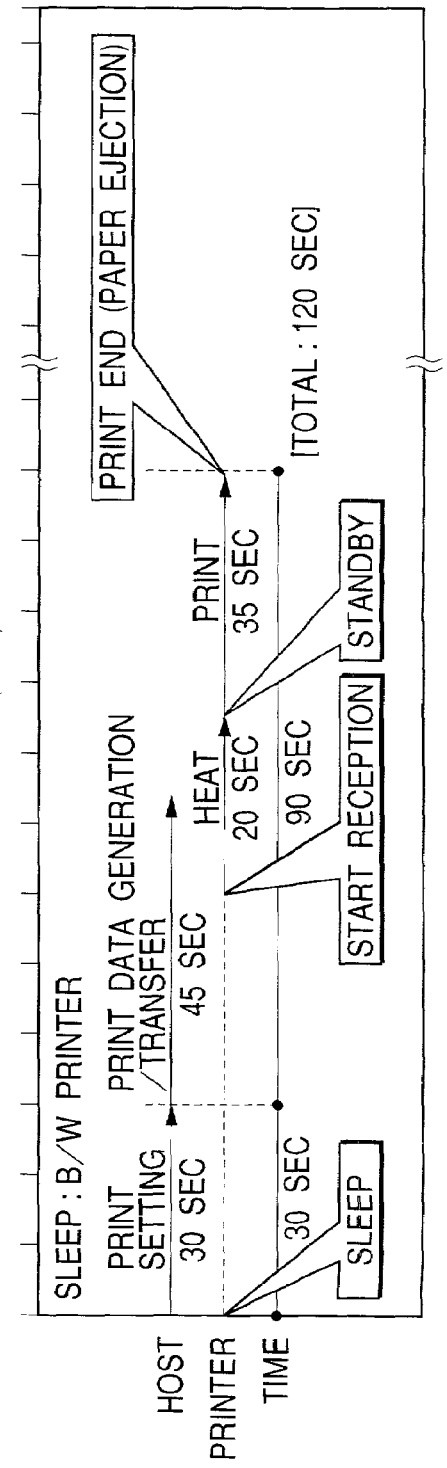
Figure 13A:
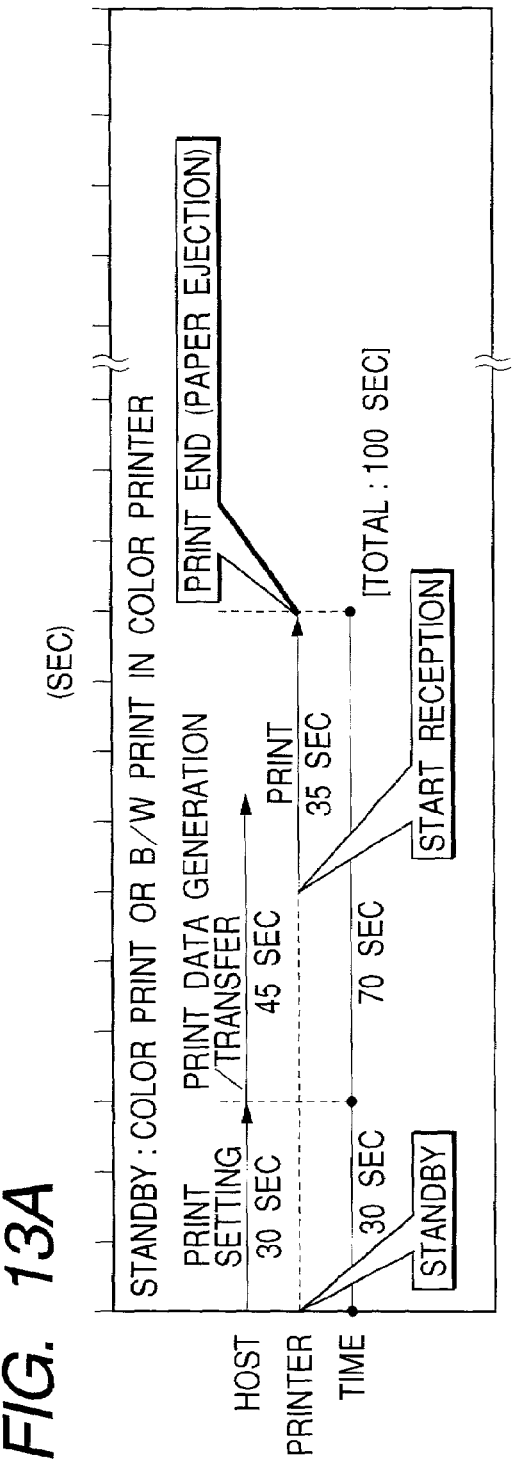
FIGS. 13A and 13B are timing charts of the printing operation of another conventional information processing system.
Figure 13B:
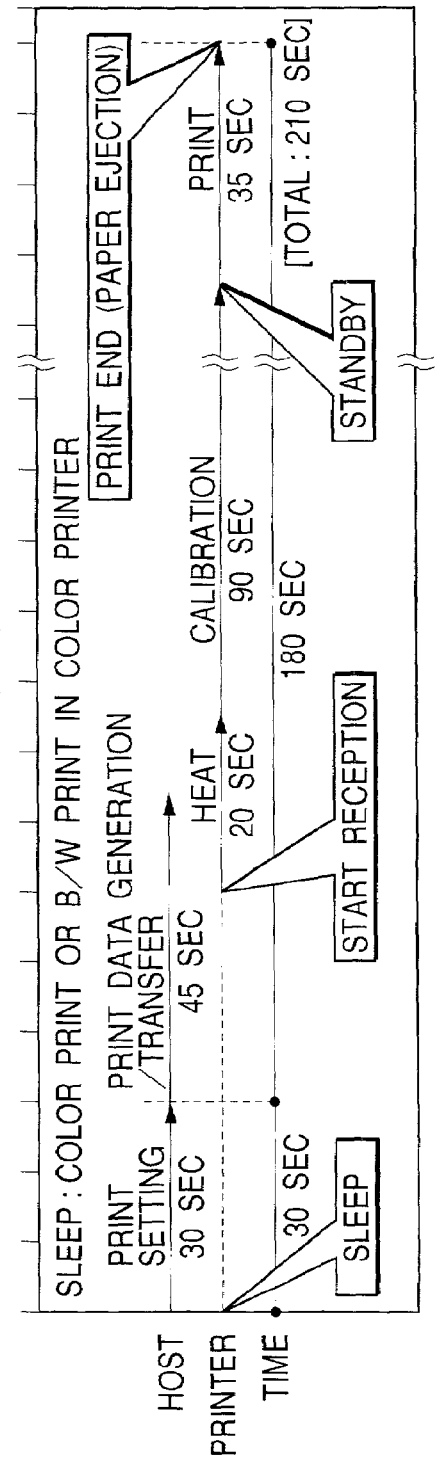

Modules in which the present invention is realized and related data may also be loaded into the host computer 10 from the memory medium reader 1050 of the host computer 10. The modules in which the present invention is realized and the related data may be recorded on the memory medium 1060 shown in FIG. 9 and may have a configuration 400 shown in FIG. 10. In such a case, the modules in which the present invention is realized and the related data can be loaded into the host computer 10 through the memory medium reader 1050 shown in FIG. 9. When the memory medium 1060 is set in the memory medium reader 1050 of the host computer 10, the modules in which the present invention is realized and the related data are read out from the memory medium 1060 and loaded into the RAM in the memory section 1030 of the host computer 10 under the control of an operating system (OS) and a basic input/output (I/O) program. The modules and data are thereby made executable or usable in accordance with the present invention. FIG. 11 shows a memory map 300 showing the modules and data loaded into the RAM in the memory section 1030 of the host computer 10 to be executed or used in accordance with the present invention.

Figure 9:
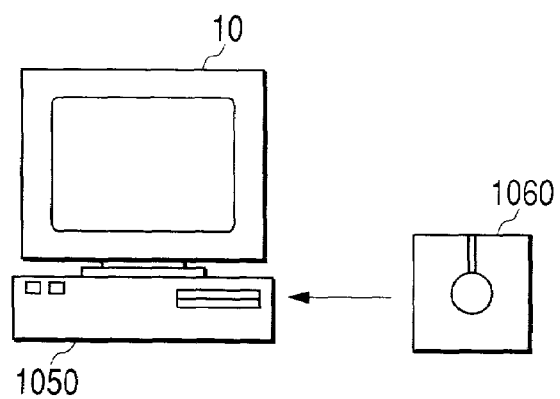
FIG. 9 is a diagram schematically showing a state where modules in which the present invention is realized and related data are loaded from a memory medium reader into the host to be executed or used.

The arrangement may be such that the modules in which the present invention is realized and related data, which are recorded on the memory medium 1060 shown in FIG. 9, are temporarily stored (installed) in the disk unit or the like in the memory section 1030 of the host computer 10, and are loaded from the disk unit into the RAM in the memory section 1030 of the host computer 10 when they are executed or used.

As mentioned above, the present invention may be completed in such a manner that a system or an apparatus is supplied with a memory medium on which program codes of a software for realizing the functions of each embodiment are recorded, and a computer (or a central processing unit (CPU) or a microprocessor unit (MPU)) provided in the system or the apparatus reads out and executes the program codes stored on the memory medium. In this case, the program codes themselves read out from the memory medium realize the above-described functions of each embodiment, and the memory medium on which the program codes are recorded constitutes the present invention.

Needless to say, the present invention comprises not only realizing the above-described functions of each embodiment by executing the program codes read out by the computer but also a method in which the OS, etc., running on the computer perform part or the whole of actual processing according to instructions provided by the program codes, and in which the above-described functions of each embodiment are realized by the processing.

Further, needless to say, the present invention also comprises a method in which the program codes read out from the memory medium are written to a memory provided in a function expansion board inserted in the computer or a function expansion unit connected to the computer, and in which a CPU or the like provided in the function expansion board or function expansion unit operates to perform part or the whole of actual processing according to instructions provided by the program codes, thereby realizing the above-described functions of each embodiment.

As described above in detail, the host unit in accordance with the present invention outputs to the print output apparatus a first command to make the print output apparatus execute shift processing for shifting from the sleep mode to the standby mode, and outputs the print data to the print output apparatus after outputting the first command. Therefore the print output apparatus can execute processing for shifting to the standby state before transmission of the print data. As a result, the speed of printing started when the print output apparatus is in the sleep state can be effectively increased.

In the case where the print output apparatus is capable of color printing and B/W printing, if a user makes a B/W output setting, the host unit in accordance with the present invention outputs to the print output apparatus a second command for stopping calibration processing before outputting the print data, thereby inhibiting unnecessary calibration processing in the case of B/W output. Therefore the print output apparatus can immediately execute printing. Consequently, the speed of printing started when the print output apparatus is in the sleep state can be effectively increased.

The print output apparatus in accordance with the present invention performs processing for shifting from the sleep mode to the standby mode when it receives the first command issued from the host unit while it is in the sleep mode before reception of the print data. Therefore the print output apparatus can execute processing for shifting to the standby state before receiving the print data. Consequently, the speed of printing started when the print output apparatus is in the sleep state can be effectively increased.

Also, the print output apparatus in accordance with the present invention enters the standby mode by stopping calibration processing when receiving the second command issued from the host unit. Therefore, when the print output apparatus outputs a B/W print, it does not perform unnecessary calibration processing and can immediately execute printing. Consequently, the speed of printing started when the print output apparatus is in the sleep state can be effectively increased.

In the information processing system in accordance with the present invention, preparation and transfer of the print data on the host unit side and processing for shifting from the sleep mode to the standby mode on the print output apparatus side are performed in parallel with each other, so that the print output apparatus can execute shift processing before transmission of the print data.

Also in the information processing system in accordance with the present invention, the host unit outputs to the print output apparatus the first command to make the print output apparatus execute processing for shifting from the sleep mode to the standby mode, and outputs the print data to the print output apparatus after outputting the first command, and the print output apparatus performs processing for shifting from the sleep mode to the standby mode when it receives the first command issued from the host unit while it is in the sleep mode before reception of the print data. Therefore the print output apparatus can execute processing for shifting to the standby state before transmission of the print data. Consequently, the speed of printing started when the print output apparatus is in the sleep state can be effectively increased.

Also in the information processing system in accordance with the present invention, the host unit outputs to the print output apparatus the second command for stopping calibration processing executed in shift processing before outputting the print data in the case of B/W output, and the print output apparatus enters the standby mode by stopping calibration processing executed in shift processing when receiving the second command issued from the host unit, thus inhibiting unnecessary calibration processing in the case of B/W output. Therefore the print output apparatus can immediately execute printing. Consequently, the speed of printing started when the print output apparatus is in the sleep state can be effectively increased.

What is claimed is:

1. An information processor that outputs print data to a printing apparatus, said information processor comprising:
  a first command output unit constructed to output a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;
  a determination unit constructed to make a determination as to whether a black-and-white printing different from a color printing has been selected;
  a second command output unit constructed to output a second command to the printing apparatus to control the printing apparatus, which is in a state of executing the calibration processing relating to the color printing, to stop the calibration processing that is in execution by the printing apparatus, in response to a result of determination that the black-and-white printing has been selected, wherein said second command is output after outputting of the first command; and
  a print data output unit constructed to output the print data to the printing apparatus after outputting of the second command.

2. An information processor according to claim 1, further comprising a color printing determination unit constructed to make a determination as to whether the printing apparatus can perform color printing, wherein the second command is output to the printing apparatus if it is determined that the printing apparatus can perform color printing and that a black-and-white printing has been selected.

3. An information processor according to claim 1, wherein the second command is output to the printing apparatus before the print data is generated.

4. An information processor according to claim 1, wherein the second command is output to the printing apparatus after a button for issuing an instruction to perform printing has been pressed and before the print data is output to the printing apparatus.

5. An information processing system including an information processor that outputs print data to a printing apparatus, and the printing apparatus which executes printing of the print data output from the information processor, said system comprising:
  a first command output unit constructed to output a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;
  a determination unit constructed to make a determination as to whether a black-and-white printing different from a color printing has been selected;
  a second command output unit constructed to output a second command to the printing apparatus to control the printing apparatus, which is in a state of executing the calibration processing relating to the color printing, to stop the calibration processing that is in execution by the printing apparatus, in response to a result of determination that the black-and-white printing has been selected, wherein said second command is output after outputting of the first command;
  a stop unit constructed to stop the calibration processing that is in execution by the printing apparatus when the second command output from the information processor is received by the printing apparatus; and
  a print data output unit constructed to output the print data to the printing apparatus after outputting of the second command.

6. A printing method used to output print data to a printing apparatus, said method comprising the steps of:
  outputting a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;
  making a determination as to whether a black-and-white printing different from a color printing has been selected;
  outputting a second command to the printing apparatus to control the printing apparatus, which is in a state of executing the calibration processing relating to the color printing, to stop the calibration processing that is in execution by the printing apparatus, in response to a result of determination that the black-and-white printing has been selected, wherein said second command is output after outputting of the first command; and
  outputting the print data to the printing apparatus after outputting of the second command.

7. A printing method according to claim 6, further comprising the step of making a determination as to whether the printing apparatus can perform color printing, wherein the second command is output to the printing apparatus if it is determined that the printing apparatus can perform color printing and that a black-and-white printing has been selected.

8. A printing method according to claim 6, wherein the second command is output to the printing apparatus before the print data is generated.

9. A printing method according to claim 6, wherein the second command is output to the printing apparatus after a button for issuing an instruction to perform printing has been pressed and before the print data is output to the printing apparatus.

10. A computer-executable printing program stored on a computer-readable medium and executed to output print data to a printing apparatus, said printing program enabling a computer to execute the steps of:
  outputting a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;

making a determination as to whether a black-and-white printing different from a color printing has been selected;

outputting a second command to the printing apparatus to control the printing apparatus, which is in a state of executing the calibration processing relating to the color printing, to stop the calibration processing that is in execution by the printing apparatus, in response to a result of determination that the black-and-white printing has been selected, wherein said second command is output after outputting of the first command; and outputting the print data to the printing apparatus after outputting of the second command.

11. A printing program according to claim 10, further comprising the step of making a determination as to whether the printing apparatus can perform color printing, wherein the second command is output to the printing apparatus if it is determined that the printing apparatus can perform color printing and that a black-and-white printing has been selected.

12. A printing program according to claim 10, wherein the second command is output to the printing apparatus before the print data is generated.

13. A printing program according to claim 10, wherein the second command is output to the printing apparatus after a button for issuing an instruction to perform printing has been pressed and before the print data is output to the printing apparatus.

14. A computer-readable memory medium on which a computer-executable printing program is stored, said printing program being executed to output print data to a printing apparatus, and enabling a computer to execute the steps of:

outputting a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;

making a determination as to whether a black-and-white printing different from a color printing has been selected;

outputting a second command to the printing apparatus to control the printing apparatus, which is in a state of executing the calibration processing relating to the color printing, to stop the calibration processing that is in execution by the printing apparatus, in response to a result of determination that the black-and-white printing has been selected, wherein said second command is output after outputting of the first command; and outputting the print data to the printing apparatus after outputting of the second command.

15. A memory medium according to claim 14, wherein said printing program further comprises the step of making a determination as to whether the printing apparatus can perform color printing, and wherein the second command is output to the printing apparatus if it is determined that the printing apparatus can perform color printing and that a black-and-white printing has been selected.

16. A memory medium according to claim 14, wherein the second command is output to the printing apparatus before the print data is generated.

17. A memory medium according to claim 14, wherein the second command is output to the printing apparatus after a button for issuing an instruction to perform printing has been pressed and before the print data is output to the printing apparatus.

18. An information processor that outputs print data to a printing apparatus, said information processor comprising:

a controller constructed to output a first command to the printing apparatus to control the printing apparatus to shift from a state of saving power consumption to a state in which the printing apparatus is on standby for a printing, wherein the printing apparatus commences execution of calibration processing relating to a color printing after receipt of the first command, and constructed to output a second command to the printing apparatus to control the printing apparatus, which is in a state of executing calibration processing relating to the color printing, to stop the calibration processing that is in execution by the printing apparatus, wherein said second command is output after outputting of the first command if a black-and-white printing different from the color printing has been selected, and constructed to output the print data to the printing apparatus after outputting of the second command.

19. A printing method used when print data is output to a printing apparatus, said method comprising the steps of:

outputting a first command to the printing apparatus to control the printing apparatus to shift from a state of saving power consumption to a state in which the printing apparatus is on standby for a printing, wherein the printing apparatus commences execution of calibration processing relating to a color printing after receipt of the first command;

outputting a second command to the printing apparatus to control the printing apparatus, which is in a state of executing the calibration processing relating to the color printing, to stop the calibration processing that is in execution by the printing apparatus, if a black-and-white printing different from the color printing has been selected, wherein said second command is output after outputting of the first command; and outputting the print data to the printing apparatus after outputting of the second command.

* * * * *